Patented Mar. 30, 1937

2,075,347

UNITED STATES PATENT OFFICE 2,075,347

TERTIARY AMINES OF THE BENZENE SERIES AND A PROCESS OF MAKING THE SAME

Hans Lange, Dessau in Anhalt, Germany, assignor to General Aniline Works, Inc., New York, N. Y., a corporation of Delaware No Drawing. Application March 29, 1934, Serial No. 718,084. In Germany April 27, 1933

15 Claims. (Cl. 260—128)

The present invention relates to a process for manufacturing compounds of the general formula

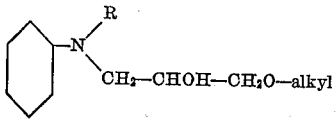

in which R is an alkyl radicle containing more than 3 carbon atoms, preferably butyl and in which the benzene nucleus may contain further substituents such as alkyl, alkoxy, halogen.

Further objects of the invention are the new products obtainable according to this process.

By the action of epichlorhydrin on primary aromatic bases in dilute alcoholic solution there occurs with opening of the ethylene oxide ring a coupling with the base, without exchange of chlorine, as represented by the following equation:

(I) 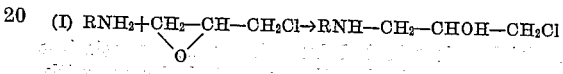

On the other hand, if the components are allowed to react directly with each other, not only the glycide-group but also the chlorine atom reacts and there is obtained, for example in the case of aniline, the hydroxypropylenediphenyldiamine according to the following equation:

(II) 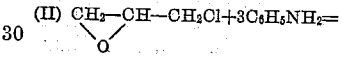

C₆H₅NH—CH₂—CHOH—CH₂—NH—C₆H₅+C₆H₅NH₂·HCl

This invention is based on the unexpected observation that, for instance, butylaniline and its derivatives may be heated with epichlorhydrin to temperatures above 100° C. and if the temperature be maintained between limits easily ascertainable for each derivative the change that occurs is essentially coupling in the sense of Equation I. The exchange of the chlorine atom for the alkoxy-group occurs when the crude product is boiled with alcoholic alkali.

The invention consists in the application of this observation and consists in the process of making in good yield new bodies which are valuable as intermediate products in the manufacture of dyes of various kinds.

The following examples illustrate the invention, the parts being by weight:—

*Example 1.*—149 parts of N-butylamino-benzene and 93.5 parts of epichlorhydrin are heated together for 20 hours at 95–100° C. and finally for 1 hour at 120° C. The temperature is then kept for 5 hours at 120–125° C. and the mass is cooled and mixed with a solution of 45 parts of sodium hydroxide in 600 parts of ethyl alcohol. The whole is now boiled for some hours in a reflux apparatus, cooled and neutralized with hydrochloric acid. After filtering the salt that has separated, the alcohol is distilled from the filtrate and the residue of this distillation is distilled in a vacuum. There are thus obtained 140 parts of N(γ-ethoxy-β-hydroxypropyl)-N-butylamino benzene. Boiling point at 12 mm. pressure=182° C. to 183° C.

*Example 2.*—367 parts of 3-chloro-1-butylamino-benzene and 187 parts of epichlorhydrin are heated together for 5 hours to 130 to 140° C. After cooling, there is added a solution of 90 parts of caustic soda in 1200 parts of methanol and the solution thus obtained is boiled for some hours in a reflux apparatus. The working up is performed as described in Example 1. There are obtained 310 parts of 3-chloro-1-N(γ-methoxy-β-hydroxypropyl)-N-butylamino-benzene. Boiling point at 12 mm. pressure=200 to 202° C.

*Example 3.*—193 parts of 1-methyl-4-methoxy-3-butylamino-benzene and 93.5 parts of epichlorhydrin are heated together within 2 hours to 150° C. and this temperature is maintained for 4 hours. After cooling, the product is mixed with a solution of 45 parts of caustic soda lye in 500 parts of methanol and the whole is boiled and worked up as described in Example 1. There are obtained 160 parts of 1-methyl-4-methoxy-3-N(γ-methoxy-β-hydroxypropyl)-N-butylamino-benzene. Boiling point at 11 mm. pressure=186 to 187° C.

*Example 4.*—149 parts of N-butylaminobenzene and 140 parts of epichlorhydrin are heated together for 20 hours at 95 to 100° C., and then for a further hour at 120° C. After cooling, the mass is mixed with a solution of 70 parts of sodium hydroxide in 1000 parts of ethyl alcohol and the whole is boiled for some hours in a reflux apparatus, then cooled and neutralized with hydrochloric acid. After filtering the salt which has separated, the alcohol is distilled from the filtrate and the residue of this distillation is distilled in a vacuum. There are obtained 180 parts (71 per cent. of the theory) of N(γ-ethoxy-β-hydroxypropyl)-N-butylamino-benzene. The boiling point at 12 mm. pressure=182° to 183° C.

*Example 5.*—163 parts of 2-methyl-1-butylamino-benzene and 108 parts of epichlorhydrin are heated together for 4 hours at 95 to 100° C. and then for 1 hour at 120 to 125° C. After cooling, the mass is mixed with a solution of 50 parts of caustic soda in 700 parts of methanol and the solution is boiled for some hours in a reflux apparatus. The product is worked up as described in Example 4. It amounts to 180 parts (71 per cent. of the theory) of 3-methyl-1-N(γ-methoxy-β-hydroxypropyl)-N-butylaminobenzene. Boiling point at 10 mm. pressure=185° to 186° C.

Example 6.—193 parts of 1-methyl-4-methoxy-3-butylaminobenzene and 140 parts of epichlorhydrin are heated together within 2 hours to 150° C. and maintained at this temperature for 4 hours. After cooling, the product is mixed with a solution of 70 parts of caustic soda lye in 1000 parts of methanol and the whole is boiled and then worked up as described in Example 4. There are obtained 170 parts (60 per cent. of the theory) of 1-methyl-4-methoxy-3-N(γ-methoxy-β-hydroxypropyl)-N-butylaminobenzene. Boiling point at 11 mm. pressure=186 to 187° C.

It is obvious that the invention is not limited to the foregoing examples or to the specific details given therein. Other secondary amines of the benzene series containing an aliphatic hydrocarbon radicle with more than three carbon atoms other than butyl, may be treated with epichlorhydrin in the manner described above and after treated with an aliphatic alcohol such as methyl-, ethyl-, propyl- or a similar alcohol. On the other hand, the benzene nucleus of the amine may contain a plurality of the substituents mentioned above. The temperature at which the condensation is carried out, likewise may be varied and good results are obtainable at a somewhat higher or lower temperature. Preferably, the epichlorhydrin is used in an amount greater than that required theoretically.

What I claim is:—

1. The process which comprises treating a secondary aminobenzene of the general formula H—N—alkyl

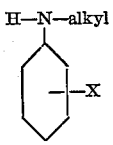

in which the alkyl radicle contains more than three carbon atoms and in which X stands for one of the group consisting of hydrogen, alkyl, alkoxy and halogen with epichlorhydrin at a temperature of about 90° C. to about 170° C. and then treating the chlorine derivative thus obtained with an alcoholic alkali.

2. The process which comprises treating a secondary aminobenzene of the general formula H—N—alkyl

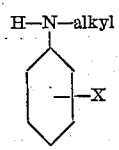

in which the alkyl radicle contains more than three carbon atoms and in which X stands for one of the group consisting of hydrogen, alkyl, alkoxy and halogen with epichlorhydrin in an amount exceeding the molecular amount necessary to combine with the secondary amine at a temperature of about 90° C. to about 170° C. and then treating the chlorine derivative thus obtained with an alcoholic alkali.

3. The process which comprises treating a secondary aminobenzene of the general formula H—N—butyl

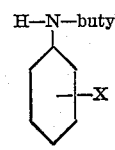

in which X stands for one of the group consisting of hydrogen, alkyl, alkoxy and halogen with epichlorhydrin at a temperature of about 90° C. to about 170° C. and then treating the chlorine derivative thus obtained with an alcoholic alkali.

4. The process which comprises treating a secondary aminobenzene of the general formula H—N—butyl

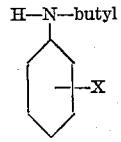

in which X stands for one of the group consisting of hydrogen, alkyl, alkoxy and halogen with epichlorhydrin in an amount exceeding the molecular amount necessary to combine with secondary amine at a temperature of about 90° C. to about 170° C. and then treating the chlorine derivative thus obtained with an alcoholic alkali.

5. The process which comprises treating a secondary aminobenzene of the general formula H—N—butyl

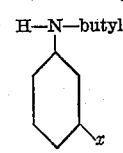

in which $x$ is selected from the group consisting of hydrogen, alkyl, alkoxy and halogen with epichlorhydrin at a temperature of about 90° C. to about 170° C. and then treating the chlorine derivative thus obtained with an alcoholic alkali.

6. The process which comprises treating a secondary aminobenzene of the general formula H—N—butyl

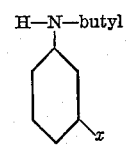

in which $x$ is selected from the group consisting of hydrogen, alkyl, alkoxy and halogen with epichlorhydrin in an amount exceeding the molecular amount necessary to combine with secondary amine at a temperature of about 90° C. to about 170° C. and then treating the chlorine derivative thus obtained with an alcoholic alkali.

7. The process which comprises treating 3-chloro-1-butylaminobenzene with epichlorhydrin at a temperature up to about 140° C. and then treating the chlorine derivative thus obtained with an alcoholic alkali.

8. The process which comprises treating 1-methyl-4-methoxy-3-butylaminobenzene with epichlorhydrin at a temperature up to about 150° C. and then treating the chlorine derivative thus obtained with an alcoholic alkali.

9. The process which comprises treating 1-methyl-3-butylaminobenzene with epichlorhydrin at a temperature up to about 125° C. and then treating the chlorine derivative thus obtained with an alcoholic alkali.

10. The tertiary aminobenzene of the general formula

R—N—CH$_2$·CHOH·CH$_2$O alkyl

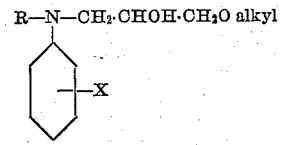

in which R is an alkyl radicle containing more than three carbon atoms and X stands for one of the group consisting of hydrogen, alkyl, alkoxy and halogen.

11. The tertiary aminobenzene of the general formula butyl—N—CH₂·CHOH·CH₂O alkyl

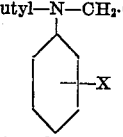

in which X stands for one of the group consisting of hydrogen, alkyl, alkoxy and halogen.

12. The tertiary amines of the general formula butyl—N—CH₂·CHOH·CH₂O alkyl

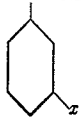

in which $x$ is selected from the group consisting of hydrogen, alkyl, alkoxy and halogen.

13. 3-chloro-1-N(γ-methoxy-β-hydroxypropyl)-N-butylaminobenzene, boiling at 12 mm. pressure at 200 to 202° C.

14. 1-methyl- 4 -methoxy- 3 -N(γ-methoxy- β -hydroxypropyl)-N-butylaminobenzene, boiling at 11 mm. pressure at 186 to 187° C.

15. 1 - methyl- 3 -N(γ-methoxy-β-hydroxypropyl)-N-butylaminobenzene, boiling at 10 mm. pressure at 185 to 186° C.

HANS LANGE.